United States Patent [19]

Lupton, Jr. et al.

[11] Patent Number: 5,622,137

[45] Date of Patent: Apr. 22, 1997

[54] TEMPERATURE SENSORS

[75] Inventors: Elmer C. Lupton, Jr., Boston; Thomas E. Ford, Winchester; Peter E. Ford, North Billerica, all of Mass.

[73] Assignee: Trans World Services, Melrose, Mass.; a part interest

[21] Appl. No.: 218,083

[22] Filed: Mar. 24, 1994

[51] Int. Cl.⁶ .............................. G01K 11/06; G01K 1/14
[52] U.S. Cl. .......................... 116/217; 374/155; 374/160; 99/342
[58] Field of Search ..................................... 374/160, 161, 374/155; 116/216, 217; 99/342

[56] References Cited

U.S. PATENT DOCUMENTS

| | | | |
|---|---|---|---|
| H630 | 4/1989 | Betts et al. . | |
| 1,623,666 | 4/1927 | Ferkel | 374/161 |
| 1,676,536 | 7/1928 | Ferkel | 116/216 |
| 2,269,038 | 1/1942 | Perry . | |
| 2,710,274 | 6/1955 | Kuehl | 374/161 |
| 2,799,167 | 7/1957 | Loconti . | |
| 2,928,791 | 3/1960 | Loconti . | |
| 3,175,401 | 3/1965 | Geldmacher | 116/216 |
| 3,430,491 | 3/1969 | Gignilliat, III | 374/160 |
| 3,465,590 | 9/1969 | Kluth et al. | 374/160 |
| 3,580,079 | 5/1971 | Crites | 374/160 |
| 3,845,662 | 11/1974 | Surgina et al. | 116/217 |
| 3,895,523 | 7/1975 | Nollen . | |
| 4,137,769 | 2/1979 | Parker | 99/342 |
| 4,154,106 | 5/1979 | Inoue et al. . | |
| 4,156,365 | 5/1979 | Heinmets et al. . | |
| 4,189,399 | 2/1980 | Patel . | |
| 4,235,108 | 11/1980 | Patel . | |
| 4,238,352 | 12/1980 | Patel . | |
| 4,240,926 | 12/1980 | McNelly . | |
| 4,276,190 | 6/1981 | Patel . | |
| 4,280,441 | 7/1981 | McNeely | 116/217 |
| 4,325,254 | 4/1982 | Svacina et al. . | |
| 4,327,117 | 4/1982 | Lenack et al. . | |
| 4,339,207 | 7/1982 | Hof et al. . | |
| 4,339,951 | 7/1982 | Yee et al. . | |
| 4,345,470 | 8/1982 | Hof et al. . | |
| 4,353,990 | 10/1982 | Manske et al. . | |
| 4,362,645 | 12/1982 | Hof et al. . | |

(List continued on next page.)

FOREIGN PATENT DOCUMENTS 0647379  12/1950  United Kingdom .................. 374/160

OTHER PUBLICATIONS

"Methods for Detecting Processing Temperatures ...", Feb. 1989, Journal of Food Protection, vol. 52, Townsend et al.
"Transmission of Escherichia Coli 0157:H7 Infection ...", pp. 883–888, Jama Feb. 1993, vol. 269, No. 7, Belongia et al.
"Escherichia Coli 0157:H7: Epidemiology, ...", Journal of Food Protection, vol. 55, Jul. 1992, Padhye et al.
The National Provisioner/Jul. 1993, Supplier Marketplace, p. 58, "Temperature tester strip ensures destruction of E. coli in hamburger patties".

*Primary Examiner*—Diego F.F. Gutierrez
*Attorney, Agent, or Firm*—Hayes, Soloway, Hennessey, Grossman & Hage, P.C.

[57] ABSTRACT

A low cost, disposable temperature sensor comprising a non-porous rigid substrate having a colored patch of a contrasting color, covered by a thermochromic material which obscures the colored patch. The thermochromic material, which has a color in the visual range which completely obscures the underlying colored patch, is selected to have a melting or solidus point such that when the material is exposed to a predetermined temperature, the thermochromic material permanently changes to a relatively transparent color whereby the colored patch on the substrate is rendered visible through the thermochromic material. A transparent cover or film encapsulates the thermochromic material place on the substrate. In a preferred embodiment of the invention, the substrate comprises a paperboard product, and includes printed indicia for making a permanent record. The sensor has particular utility in measuring safe cooking temperature of food,

14 Claims, 3 Drawing Sheets

U.S. PATENT DOCUMENTS

| | | |
|---|---|---|
| 4,377,733 | 3/1983 | Yamaguchi et al. . |
| 4,388,332 | 6/1983 | Egee et al. . |
| 4,389,217 | 6/1983 | Baughman et al. . |
| 4,395,718 | 7/1983 | Murayama et al. . |
| 4,410,493 | 10/1983 | Joslyn . |
| 4,427,985 | 1/1984 | Kikuchi et al. . |
| 4,428,321 | 1/1984 | Arens . |
| 4,469,452 | 9/1984 | Sharpless et al. . |
| 4,524,778 | 6/1985 | Brown, Jr. et al. . |
| 4,601,588 | 7/1986 | Takahara et al. . |
| 4,629,330 | 12/1986 | Nichols . |
| 4,643,588 | 2/1987 | Postle et al. . |
| 4,647,224 | 3/1987 | Holm et al. . |
| 4,696,580 | 9/1987 | Kameda . |
| 4,735,745 | 4/1988 | Preziosi et al. . |
| 4,737,463 | 4/1988 | Bhattacharjee et al. . |
| 4,743,398 | 5/1988 | Brown et al. . |
| 4,753,188 | 6/1988 | Schmoegner . |
| 4,756,758 | 7/1988 | Lent et al. . |
| 4,786,773 | 11/1988 | Keefer . |
| 4,805,188 | 2/1989 | Parker . |
| 4,812,053 | 3/1989 | Bhattacharjee . |
| 4,826,762 | 5/1989 | Klibanov et al. . |
| 4,834,017 | 5/1989 | Favetto et al. . |
| 4,846,095 | 7/1989 | Emslander ................................ 116/216 |
| 4,893,477 | 1/1990 | Vazquez . |
| 4,922,071 | 5/1990 | Samford . |
| 4,987,908 | 1/1991 | Sprinkel et al. . |
| 5,045,283 | 9/1991 | Patel . |
| 5,053,339 | 10/1991 | Patel . |
| 5,057,434 | 10/1991 | Prusik et al. . |
| 5,076,197 | 12/1991 | Darringer et al. . |
| 5,083,815 | 1/1992 | Scrymgeour et al. .................. 116/216 |
| 5,085,802 | 2/1992 | Jalinski . |
| 5,152,611 | 10/1992 | Pieper et al. . |
| 5,153,036 | 10/1992 | Sugisawa et al. . |
| 5,180,598 | 1/1993 | Jozefowicz . |
| 5,182,212 | 1/1993 | Jalinski . |

TEMPERATURE SENSORS

BACKGROUND OF THE INVENTION

1. Field of the Invention

This invention relates to devices capable of sensing and indicating when a predetermined minimum temperature has been reached. The invention has particular utility in connection with detecting when food such as ground beef has been cooked to a safe temperature for consumption, and will be described in connection with such utility, although other utilities are contemplated.

2. Background of the Invention

*E. coli* is found in the intestines of all mammals. *E. coli* contamination of food causes tens of thousands of cases of food poisoning annually in the United States. A particularly virulent strain *E. coli* 0157:H7 was found to be responsible for several widely publicized outbreaks of food poisoning during the first half of 1993, including an outbreak in Washington state which caused three fatalities, and fatal outbreaks in Illinois, Indiana, Michigan and Maine. Recent U.S. Public Health Service purchase studies suggest that two to three percent of all hamburger sold in the United States contains *E. coli* 0157:H7. Thus, this organism presents a serious food-borne illness problem.

The problem of *E. coli* contamination and particularly *E. coli* 0157:H7 contamination is particularly severe with ground meat. The inside of a cut of beef is relatively aseptic. The foreign organisms are contained primarily on the surface of the meat. This means that cooked cuts such as steaks and roasts are relatively safe since the outside surface of the meat is directly exposed to the cooking heat. However, since in grinding meat, the former external surface of the meat becomes dispersed throughout the bulk of the meat, with the result that any contamination on the external surface of the meat may be spread throughout the meat. To kill the organisms, the cooking heat must reach throughout the entire bulk of the ground meat.

Proper cooking can kill harmful organisms such as *E. coli*, Salmonella, Listeria and other harmful organisms. In the case of *E. coli* 0157:H7, the United States Department of Agriculture recommends that ground beef products be cook to an internal temperature of 155°–160° F. It is difficult to determine when this condition has been met.

Conventional liquid-glass thermometers and/or dial stick cooking thermometers generally cannot readily be used for measuring the internal temperature of a ground beef patty due to the geometry of the probe. Moreover, such thermometers have relatively slow reaction times, and have relatively high heat capacity which may contribute to considerable inaccuracies caused by introduction of the probe into the patty. Moreover, the portions of the probes extending external from the patty may be subjected to cooking heat which may further contribute to inaccurate readings. Liquid glass thermometers also pose a particular safety hazard in the event of breakage. Additionally, neither liquid/glass thermometers nor dial stick thermometers provide a permanent record, which may be important for commercial users such as fast food restaurants or the like.

Thermocouple and thermistor devices also can be used to measure temperature of ground beef patties. However, thermocouple and thermistor devices are relatively expensive and require expensive, fragile electronic equipment for calibration and measurement. Also, thermistor devices can be relatively slow acting and have been observed to require twenty seconds or more to achieve stable temperature readings.

Another problem with current instruments of measuring temperature is that they must be used many times to be economical. Unless very carefully cleaned after each use, the temperature measuring device can actually spread contamination from one piece of meat to another.

It is thus an object of the present invention to provide a temperature sensing and indicating device which overcomes the aforesaid and other problems of the prior art. A more specific object of the present invention is to provide a low cost, temperature sensor and indicator device which advantageously may be used both commercially and domestically, for determining when a ground meat patty or other food product has been cooked sufficiently to raise the internal temperature so that it is safe for human consumption.

SUMMARY OF THE INVENTION

In accordance with the present invention, there is provided a low cost, disposable temperature sensor which provides a permanent record which is easy to read or interpret comprising a substantially non-porous, relatively rigid, elongate substrate having a colored patch covered by an overlying layer of a particulate thermochromic material adjacent one end of the substrate. The end of the substrate bearing the colored patch and overlying layer of thermochromic material is sealed between two pieces of sealable film or pressure sensitive adhesive tape. The particulate thermochromic material, preferably should have a particle size in the 5 to 20 micron range, whereby to cause the visible light to become scattered, and thereby obscure the underlying colored patch, and a melting or solidus point such that when the material is exposed to a predetermined temperature, the thermochromic material melts or flows to a relatively transparent form whereby the colored patch on the substrate is rendered visible through the overlying thermochromic material. Once changed to a relatively transparent form, i.e. by exposure to a predetermined temperature, the thermochromic material ordinarily remains relatively transparent, even when cooled below its melting or solidus point. However, in a preferred embodiment of the invention, the thermochromic material may be caused to revert to a light scattering particulate form sufficient to again obscure the patch or part of the patch, by scratching or abrading the tape covering which encapsulates the thermochromic material in place on the substrate. In a preferred embodiment of the invention, the substrate comprises a paperboard product, and may includes printed indicia for prompting recordation of time, and date.

BRIEF DESCRIPTION OF THE DRAWINGS

Still other objects and advantages of the present invention will become clear from the following detailed description of the invention, taken in conjunction with the accompanying drawings, wherein.

DETAILED DESCRIPTION OF THE INVENTION

Figure 1:
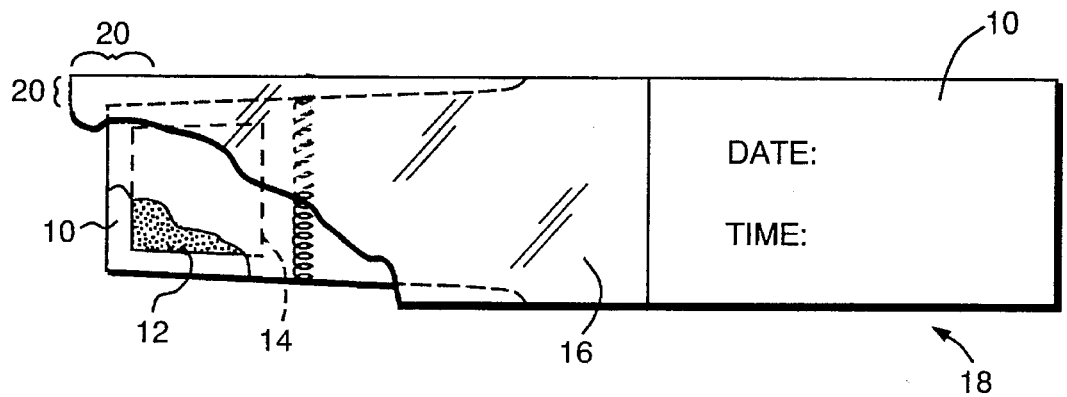
FIG. 1 is a plan view of a temperature sensor/indicator made in accordance with the preferred embodiment of the present invention.
Figure 2:
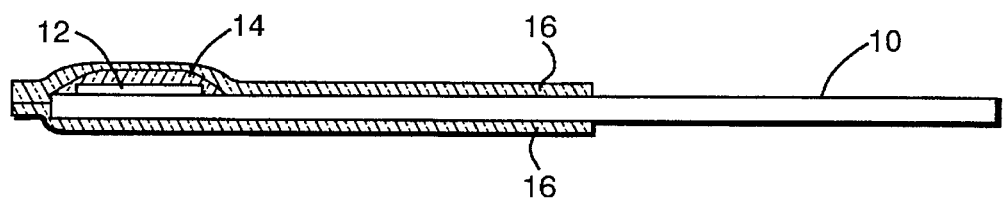
FIG. 2 is a side view, in cross section, of the device shown in FIG. 1.
Figure 3A:
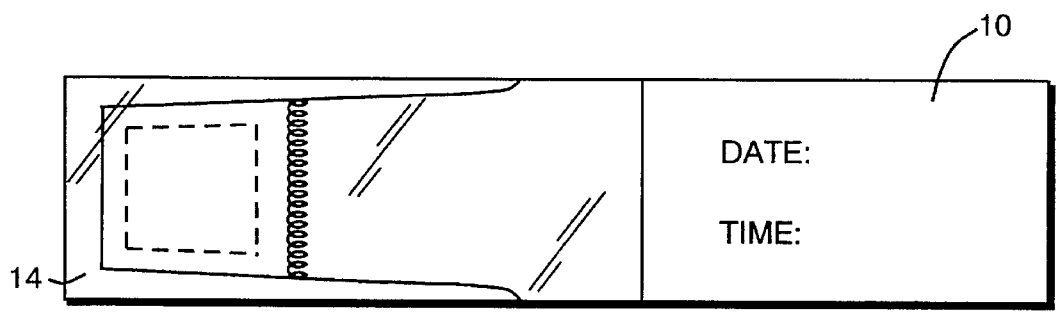
FIG. 3A is a view similar to FIG. 1, and showing the device prior to use.
Figure 3B:
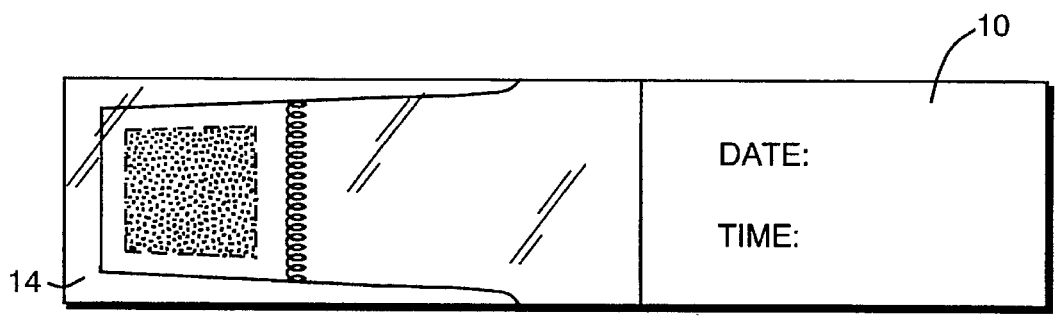
FIG. 3B is a view similar to FIG. 3A, and showing the device after user.

Referring to the drawings, a temperature sensor/indicator in accordance with the present invention comprises a substantially non-porous substrate 10, preferably formed of a stiff paperboard blank or the like. Substrate 10 should be sufficiently non-porous so that a thermochromic material 14 carried on the substrate remains substantially only on the surface of the substrate, without penetrating interstitially the pores below the surface of the substrate. Substrate 10 should be sufficiently stiff or rigid so that the sensor/indicator may be thrust into a ground meat patty or other food product to be monitored. Particularly preferred as paperboard product is 26 point SBS paperboard, although other commercially available paperboard products may be used.

One or both planar sides of substrate 10 have printed thereon, adjacent one end thereof, a contrasting color patch 12. Color patch 12 is covered by thermochromic material 14 which has a triggering temperature selected to be equal to or slightly below the target temperature. Material 14 has a "normal" or pre-triggering crystalline structure and color such as to obscure the underlying color patch 12. However, material 14 upon exposure to its triggering temperature permanently changes to a relatively transparent material such that color patch 12 becomes visible.

The coated substrate is encapsulated within a sealable film, or between two pieces of pressure sensitive adhesive tape 16 which completely encapsulate and seal at least the lower portion of the substrate including entirely that portion of the substrate bearing color patch 12 and the covering thermochromic material 14. Preferably, the top portion or end 18 of the substrate will be left tape-free as to provide a writing surface, i.e. so that the user may create a permanent record. If desired, indicia such as date and time, or batch number or the like may be preprinted on end 18 as a recordkeeping reminder for the user.

The thermochromic material employed in accordance with the present invention may comprise a variety of commercially available thermochromic materials which change color at the target temperature from a colored appearance to substantially clear appearance. Preferably but not necessarily, the thermochromic material will remain clear following exposure to the triggering temperature but may be caused to revert to a colored appearance by abrading the covering tape which encapsulates the material on the substrate. Because the thermochromic material is completely encapsulated by the film 16, the thermochromic material may be chosen from a wide variety of thermochromic materials whose primary selection criteria resides in the thermal performance, without regard to whether the material complies with regulations for direct or indirect food additives. Among materials which advantageously may be used in accordance with the present invention are mentioned TEMPILAQ™ 156, available from Tempil Industries, South Plainfield, N.J. The manufacturer describes this as a solvent based lacquer which contains a thermochromic solid which melts at 156° F. TEMPILAQ™ 156, when dispersed from solvent and dried in situ, is normally a light grey crystalline material at room temperature, but upon melting at 156° F. forms a transparent fluid which, upon cooling, resolidifies as a principally transparent solid. Another preferred crystalline material is TEMPIL TMA™ 156, also available from Tempil Industries, South Plainfield, N.J. The manufacturer describes this as a water based slurry which contains a thermochromic solid which melts at 159°–160° F. TEMPIL TMA™ 156 also, when dispersed from liquid slurry, dries to a white crystalline material. However, upon exposure to temperature of 156°–160° F., melts and upon cooling, forms a transparent material. Another preferred thermochromic material is dithiuram.

Other commercially available materials which may be dried in place to form an opaque crystalline material which, upon exposure to a predetermined target temperature, e.g. in the 156°–160° F. range, forms a transparent material, upon cooling, in accordance with the present invention include 4-benzyloxy-3-methoxybenzyl alcohol, crotonic acid, diphenylacetonitrile, trans-2,4 pentadienoic acid, (r)-(–)-5-oxo-2-tetrahydrofurancarboxylic acid, (r)-(+)-5-oxo-2-tetrahydrofurancarboxylic acid, (2R,3R)-(+)-3-(4-bromophenyl)glycidol, diphenyl(pentafluorophenyl)phosphine, tritriacontane, (R)-(+)-1,2-Bis(diphenylphosphino)propane, 3,4-dimethoxybenzoyl chloride, (+/–)-alpha-methoxypheynlacetic acid, (1S)-9-)-camphanic chloride, 5-bromopyridine, 5-bromo-1,2,4-trimethylbenzene, 3-methoxyphenylacetic acid, ethyl 4-nitrobenzoylacetate, N,N-diphenylformamide, 2,6-dimethylbenzoquinone, 4-(chloromethyl)biphenyl, DL-batyl alcohol, trimethylsilyl N-(trimethylsilyl)-carbamate, 2-chloro-4,6-dimethoxy-1,3,5-triazine, tert-butyl 4-benzyl-1-piperazine-carboxylate, 4'-fluoro-2'-nitroacetanilide, 4,4'-trimethylenebis(1-piperidinepropionitrile), 3-fluorocatechol, 4-bromo-2-chloroaniline, methyl hydrazinocaroxylate, 2,2,2-trifluoroacetamide, 4-nitrobenzyl chloride, 2'-hydroxy-4',5'-dimethylacetophenone, (+/–)-1,2,3,4-tetrachlorobutane, 4-chloro-1,2-phenylenediamine, 1-ally-2-thiourea, 3-diethylaminophenol, tetraethylthiuram disulfide, 5-nitroquinoline, diethyl bis(4-pivaloylbenzyl)malonate, epsilon-caprolactam, potassium ferricyanide trihydrate, 2-(bromomethyl) acrylic acid, selenious acid, 2,3-dimethyl-4-nitroanisole, 1,2,3,4,5,6,7,8-octahydroacridine, trans-1-(2-pyridyl)-2-(4-pyridyl)ethylene, (+/–)-(1,2-dibromoethyl)benzene, 4,4'-dipyridyl hydrate, 3-quinolinecarboxaldehyde, benzofuran-2-yl methyl ketone, 4-((R)-(–)-2-chloro-3-methylbutyryloxy)-phenyl 4-(decyloxy)benzoate, (S)-(–)-alpha-methyl-2-naphthaene-methanol, beta-alanine ethyl ester hydrochloride, di tert-butyl oxalate, stearyltributylphosphonium bromide, 4,7,13,16,21,24-hexaoxy-1,10dizazbicyclo(8.8.8)-hexacosane, stearic anhydride 2-chloroethylphosphonic acid, 2,5-dibromo-6-isopropho-3-methyl-1,4-benzoquinone, 4,4-dimethyl-3-oxopentanenitrile, itaconic anhydride, mesitol, 2-chloro-4,5-dimethylphenol, 4-chlorobenzyl alcohol, ethyl diphenylcarbanate, p-tolyl benzoate, 2-chloro-4-fluoro-5-methylaniline, N-(tert-butoxycarbonyl)-L-isoleucine, tetrabutylammonium p-toluenesulfonate, 1-methylindole-3-carboxaldehyde, (4R)-(+)-4-isopropyl-2-oxazolidinone, 2-quinolinecarboxaldehyde, biphenyl d-10, 4-((S)-(+)-2-chloro-3-methylbutyrloxy)-phenyl 4-(decyloxy)benzoate, 3,4,5,6-tetrahydrophthalic anhydride, 4,4'-azoxytoluene, cholesteryl myristate, 3,3'-dimethyl-4,4'-biphenylene diiioscyanate, decylsuccinic anhydride, 4-(4- nitrobenzyl)-pyridine, 2-nitrobenzylalcohol, 2,2'-dipyridyl, 2,6-dichlorobenzadehyde, 3,4-dichloroaniline, 5-chloro-2-nitroanisole, and 2-chloro-4,5-dimethylphenol.

Other chemical compounds or blends of compounds may be selected for the device if transition temperatures other than 60° F. are desired. Some such temperatures might be 140° F., 170° F. and 180° F.

Compounds suitable for use to measure 140° F. in accordance with the present invention include:

2-vinylnaphthalene; 1-phenyl-1-cyclohexanol; isopropylcarbamate; 4-chloro-3-nitrobenzenesulfonyl fluoride; 4-methoxybenxophenone; 9-bromophenanthrene; acetoneoxime; 3-nitrophenylacetonitrile; 1,1,1,-triphenylsilylamine; 2,4-dihydro-5-methyl-2-phenyl-4-(trichloroacetyl)-3H-pyrazol-3-one; 3-chloro-2,4-difluoroaniline;diethyl(Phthalimidomethyl) phosphonate; 4-chloro-2, 6-bis(trifluoromethyl) pyridine; 4,4'-diazo-2, 2-stilbenedisulfonic acid, disodium salt tetrahydrate; 2-chloro-4-fluorobenzaldehyde; 2,3-difluoro-6-nitrophenol; dimenthyl 1,3-adamantanedicarboxylate; 3-oacetyl-1,2:5,6-di-o-isopropylidene-alpha-d-glucofuranose; diazald-n-methyl; 3-ethoxy-2-methyl-2-cyclohexan-1-one; (1R-trans)-2-(bromomethyl)-2-metnyl-3-methylenecyclopentaneacetic acid; (2S)-(+)-glycidyl-4-nitrobenzoate; (2R)-(+)-glycidyl 4-nitrobenzoate; dicyclohexylphenyl phosphine; 1-nondecanol; 1,8-dimethylnaphthalene; 4-chloro-2-isopropyl-5-methylphenol; 1-octadecanol; 2,4-dichlorophenyl isocyanate; 1-bromo-2,3,5,6-tetramethylbenzene; 4'-hydroxyvalerophenone; methyl 4-formylbenzoate; sodium perborate tetrahydrate; 2,4,6-trichloroanisole; 2,4-dibromo-6-phenylphenol; 2-(trifluoromethyl) benzophenone; 5-methylindole; 4-heptyloxyphenol; (+/−)-2-hydroxycaproic acid; 3',5'-dibenzyloxyacetophenone; 2.2-dichloro-1-methylcyclopropanecarboxylic acid; 2,4'-dipyridyl; 9-ethylbicyclo(3.3.1)nonan-9-ol; 1-methallyl-3-methyl-2-thiourea; methyl 2-phenyl-4-quinolinecaroxylate; (+/−)-3-benzylphthalide; N-benzylformanide; 2-chloro-4'-fluorobenzophenone; 2-bromo-3'-methoxyacetophenone; and, N-phenyl-1-naphthylamine Compounds suitable for use to measure 180° F. in accordance with the present invention include:

4-phenoxyaniline; methyl 3,4,5-trimethoxybenzoate; 2-hydroxy-1-naphthaldehyde; 9-fluorenone; 4-ethyl-3-thiosemicarbazide; 3-dimethylaminophenol; 2,5-dibromonitrobenzene; alpha-bromophenylacetic acid; trithiocyanuric acid, trisodium salt nonhydrate; 3,3'-dimethoxybenzio; (2R, 6R)-2-Tert-buryl-6-methyl-1,3-dioxan4-one; (S)-(−)-2hydroxy-N-methylsuccinimide; methyl 4-acetoxybenzoate; 3'-fluoroacetanilide; 3-isochromanone, 4'-iodoacetophenone; 4-methoxypyridine N-oxide hydrate; (1R,2S,5R)-(+)-5 methyl-2-(1-methyl-1-phenylethyl)cyclohexylolacetate; perfluoroadipic acid hydrate; diethyldithiocarbamic acid, diethylammonium salt; mono-methyl phthalate; N-benzylidenebenzenesulfonamide; methylthiomethyl p-tolyl sulfone; cholesta-4,6-dien-3-one; 1,2,3-heptanetriol; benzoylacetonitrile; (+/−)-ethanolamine hydrochloride; 4-(4-hydroxyphenyl)-2-butanone; 2-nitrophenylacetonitrile; dithiodierythritol; 1-(3,4-dihydro-2-napththyl) pyrrolidine; carbobenzyloxy-1-alanine; diphenylcarbamylchloride; 2-methoxy-1-naphthaldehydr; N,N-diethyl-4-nitrosoaniline, 3,5-dibaromosalicylaldehyde; 2-bromo-2-acetonaphthone; 2,4-dinitrophenetole; 2-phenylbutyramide; 1-methoxy-4-nitronaphthalene; 2-hydroxy-5-methylbenzophenone; 4-fluorophenylacetic acid; 1-chloro-4-nitrobenzene; trans-3-chloroacrylic acid; alpha methyl-alpha phenyl succinimide; cetylpyridinium chloride monohydrate; 3,5-bis(trifluoromethyl) Pyrazole; 1-butyl-3-nitroguanidine; (1S,2S)-(−)-1,2-diphenyleethylene-diamine; (4-metnyl-2,3,5,6-tetrfluorophenyl)-hydrazine; (+/−)-10-camphorsulfonyl chloride; histamine; dibenzofuran; (alpha, alpha, alpha-trifluoro-p-tolyl)-acetic acid; 4-phenoxylphenol; 5-chloro-o-anisidine; pyridinium trifluoroacetate; 2,2-dimethylglutaric acid; S-acetylmercaptosuccinic anhydride; 4,6-dinitro-o-cresol; cis-bicyclo(3,3,0)octane-3,7-dione; nonadecafluorodecanoic acid; 2-hydroxylbenzyl alcohol; acrylamide; benzylidenemalolnonitrile; 2-aminobenzyl alcohol; and, 2-chloro-5-nitrobenzophenone; 2-bromo-2'5'-dimethoxyacetophenone.

Compounds suitable for use to measure 170° F. in accordance with the present invention include:

4,5-dihydro-2-(ethylcarbonyl)naphtho(1,2-B)thiophene; 4-nitro-3-(trifluoromethyl)pehnol; 3'-nitroacetophenone; 1,2-diethyl-2-thiourea; 1,4-dicyano-2-butene; cyclododecanol; carbobenzyloxy-L-proline; 2-bromo-4-nitrotoluene; 4-amino-5-picoline; (+)-carbobenzyloxy-D-proline; 2,2-diethoxyacetamide; alpha-methylferrocenemethanol; (R)-(+)-3-methyladipic acid; (methoxycarbonylsulfamoyl)triethylammonium hydroxide, inner salt; 2-(3-nitrophenylsulfonyl)ethanol; 1-isoquinolinyl phenyl ketone; phenylacetic acid; 2,8-bis(trifluorometnyl)-4-quinolinecarbonitrile; 4-hydroxy-3-methyl-4-cyclopentene-1,3-dione monohydrate; (R,R)-(+)-1,4-bis-o-(4-chlorobenzyl)-D-threitol; DL-alpha amino episilon caprolactam; ethylchlorooximidoacetate; N-cyanotriethylammonium tetrafluoroborate; 3-phenylphenol; 2,5-dimethoxybenzoic acid; acetylpyrazine; N-methylbenzamide; 2-(4-methlxyphenoxy)-1,2-propanediol; alpha-methyl-alpha propyl succinimide; (alpha, alpha, alpha-trifluoro-m-tolyl)-acetic acid; plumbagin; thioacetanilide; 1-adamantyl bromomethyl ketone; N-methyl-p-toluenesulfonamide; aldrithiol-4; phenylglyoxal monohydrate; 2-naphthalenesulfonyl chloride; 2-mesitylenesulfonic acid dihydrate; 2-ethoxy-4-hydroxybenzaldehyde; 1,4-di-tert-butylbenzene; flavanone; 2-(4-methoxyphenyl)1-cyclohexanone; tetraethyldiphosphine disulfide; 3-(4-chlorophenoxy)1,2-propanediol; dicyclopropylketoxime; diethylsilbestrol dipalmitate; N-phenyl-1,2-phenylenediamine; 4-nitrophenyl acdtate; 9-methylanthracene; 6-methoxy-1-tetralone; iodoacetic acid; 1-(2-chlorophenyl)-1-(4-chlorophenyl)-2,2-dichloroethane; 1-allyl-3-(2-hydroxyetnho)2-thiourea; (+/−)-N-(benzyloxycarbonyl)-alpha-phosphonoglycine trimethyl ester; 4-aminophenyl disulfide; (S)-(−)-alpha, alpha-diphenyl-2-pyrrolidinemethanol; ethyl 4,6-di-o-acetyl-2,3-dideoxy-alpha-D-erythro-hex-enopyranoside; 4-bromo-2,3,5,6-tetrafluorobenzonitrile; 1,4,4A,8A-tetrahydro-endo-1,4-methano-naphthalene-5,9-dione; 1-fluoro-3-iodo-5-nitrobenzene; 2'-fluoroacetanilide; 4-isobutylalphamethylphenylacetic acid; 4-bromo-3-methylpyrazole; 1-ethyl-3-methyl-1H-imidazolium chloride; vanillin acetate; 2-(4-nitrophenoxycarbonyl)-proxyl, free radical; (1S,2R, 5R)-(+)-isomethol; 1-cyanothioformanilide; 3-thiophenacetic acid; 5,5-dimethyloxazolidine-2,4-dione; 3-piperidino-1, 2-propane diol; decafluorobenzhydrol; (+/−)-2-chloropropionamide; 1-chloroanthracene; 1-naphthalenesulfonic acid; alpha, alpha, diphenyl-gammabutyrolactone; 2-hydroxyisobutyric acid; tricyclo(5.2.1.02,6)decane; 11-phenoxyuncedanoic acid; 4-netrophenylchloroformate; 1,1-diphenylethanol; 2-furoic hydrazide; 1,4-cyclohexanedione; 2-azacyclononanone; 4-benzyloxybenzyl chloride; 3,4,5-trimethoxyphenylacetonitrile; and 1,1,1-trichloro-2-methyl-2-propanol hydrate.

The sealable tape 16 employed in accordance with the present invention can be either a heat sealable tape or a pressure sensitive adhesive tape. An example of the latter would be PERMACEL™ P-925. The manufacturer describes this tape as a tape based on a 2 mil polyester film with a pressure sensitive adhesive. The tape has a T-peel strength in excess of 1500 grams per inch and complies with U.S. FDA regulations for direct human food contact. Other commercially available pressure sensitive adhesive tapes useful in the present invention include TUCK TAPE™ 255CL and 3M SCOTCH™ Brand Tape grade 3750-G pressure sensitive adhesive coated polyester tapes. Example of a heat sealable films would be CHEMFILM DF™ 1700 2 mil which the manufacturer describes as a polytetrafluoroethylene film with a fluorinated ethylene propylene sealing surface, a nylon 6 film coextruded with an ionomer sealing surface and a polyester film laminated with an ethylene-vinyl acetate sealing surface.

Tape 16 should be sized to extend beyond the edges of substrate 10 by approximately 0.125 inch, so that the facing edges of the tape pieces bond together, i.e. at 20. The facing edges of the tape form a hermetic seal encasing the thermochromic material so that the devices will be FDA acceptable for insertion into hot food.

In all embodiments the thermochromic material comprises a color which originally obscures the contrasting patch on the substrate, but upon exposure to the predetermined temperature, melts and then resolidifies as a relatively transparent material whereby to permit the underlying colored patch to be seen.

The invention will be illustrated further by the following non-limiting examples:

EXAMPLE 1

A piece of 26 point SBS paperboard blank is cut approximately three inches long by one-half inch wide. A solid colored patch is printed on one end of the blank with permanent black ink (HARDEE™ Black C manufactured by Beacon Ink, Somerville, Mass.), and indicia for recording date and time are printed at the other end of the blank. The ink is allowed to dry, and TEMPILAQ™ 156 is applied with a brush to the end of the blank bearing the colored patch. TEMPILAQ™ is supplied as a 18 volume percent solvent slurry. The TEMPILAQ™ 156 is allowed to dry, and the end of the blank bearing the Tempilaq 156 coating is encapsulated between two pieces of PERMACEL™ P-925 pressure sensitive transparent polyester tape. The tape is sufficiently long to extend approximately one-half inch beyond the Tempilaq 156 patch coating on the blank, and approximately one-eighth inch above each side edge of the paperboard blank so that the facing adhesive coated edges of the tape may contact one another and completely encapsulate and seal the lower half of the blank. The tape to tape seal preferably can be accomplished by making the paperboard blank narrower at the functional end, i.e. the end bearing the colored patch. The tape pieces are pressed firmly onto the blank, and particular care is taken to press firmly together the facing extensions of the two tape pieces.

The resulting device is used to test the internal temperature of a ground beef patty while it is cooked by inserting the device into the center of the patty, left for ten seconds and then removed. Prior to insertion into the patty, the tip of the device appeared white. The device was removed and observed. If the tip had not changed color, the ground beef patty was cooked for another thirty to sixty seconds or until the temperature is judged to increase sufficiently. The device was then reinserted into the patty for another ten seconds, removed and observed. The process was repeated until the underlying patch appeared. The patty was tested with a calibrated thermocouple and the temperature was measured to be in excess of 160° F. The patty was then removed from the cooking heat. Dissection of the patty showed it was completely cooked, well-done with the juices running clear.

EXAMPLE 2

A device is made similar to Example 1 except that the liquid covering the ink is TEMPIL™ 156 which is also supplied as an 18 volume percent aqueous slurry although slurries at other solids levels have been observed to perform in a satisfactory manner. The liquid slurry is laid onto the paperboard and leveled with a metal squeegee with a 10 mil relief to squeeze coating to uniform thickness, which is dried-in-place as in Example 1. The TEMPIL™ 156 coated blank is then encapsulated between two pieces of PERMACEL™ P-925 as in Example 1, and the resulting device was used to test the internal temperature reached by a cooking patty, as in Example 1. Similar results were obtained.

A feature and advantage of the present invention is that the temperature sensor of the present invention, while on the one hand providing a permanent record, for example, for institutional or commercial users, may be regenerated and caused to undergo the thermochromic transition again either by the consumer or test the accuracy of the original thermochromic transition by abrading or scraping the overlying tape with the fingernail, utensil handle or the like, using moderate pressure. After a few abrasions, the underlying patch disappears and the white color returns or partially returns.

Figure 4A:
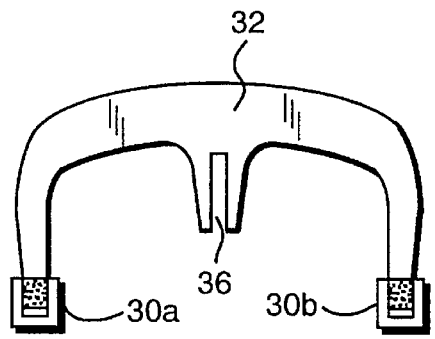
FIGS. 4A and 4B are plan views of alternative form of temperature sensor/indicator device made in accordance with the present invention, in disassembled form.
Figure 4B:
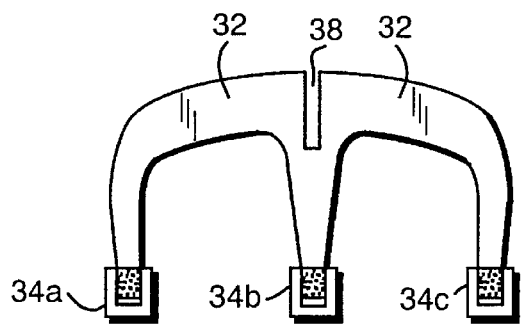
Figure 5:
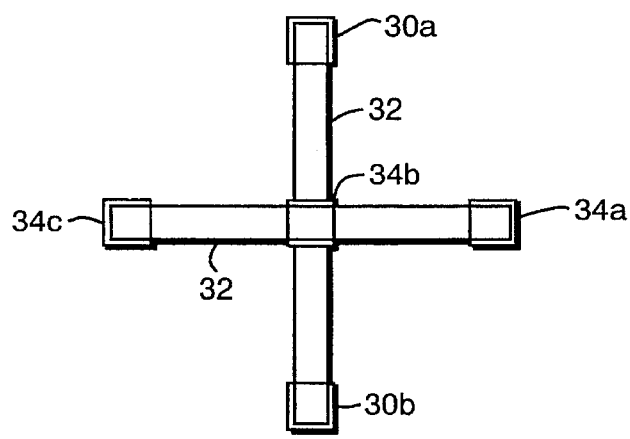
FIG. 5 is a top plan view of the device shown in FIGS. 4A and 4B, assembled.

While a preferred embodiment of the present invention has been described in detail above, various modifications may be made without departing from the spirit and scope of the invention. For example, the temperature sensor in accordance with the present invention may be formed with a plurality, e.g. two temperature sensor probes 30A,30B formed by a common bridge 32 as shown in FIG. 4A, or with three temperature sensor probes 34A,34B,34C as shown in FIG. 4B. Alternatively, if desired, the FIGS. 4A and 4B sensors may be assembled together, for example, at complementary notches 36,38 to form a five probe unit as shown in FIG. 5. In each case, the probe areas should comprise a colored patch having a particulate thermochromic material overlay, and encapsulated within a sealable film as above described.

Figure 6:
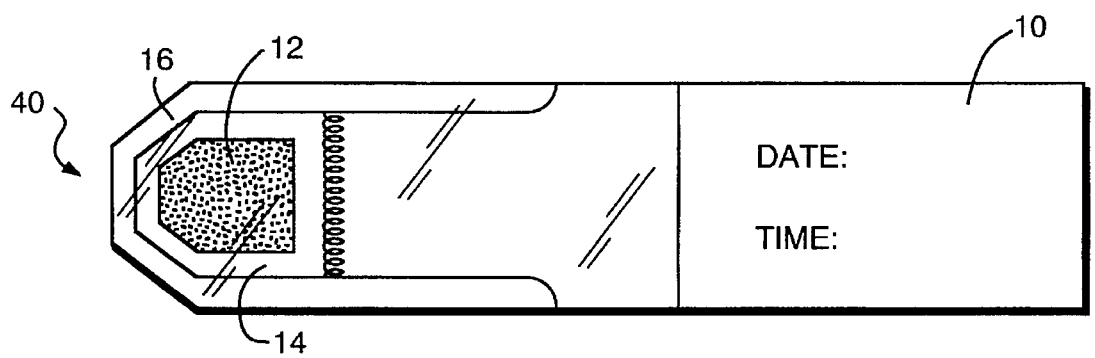
FIG. 6 is a view similar to FIG. 1, and showing yet another alternative form of temperature sensor/indicator device made in accordance with the present invention.

The invention also advantageously may be used for monitoring, for example, cooking of solid meat, such as chops or roasts, chicken breasts or other chicken parts, fish, eggs and reheating of food. Ordinarily, the device is sufficiently stiff so that it may penetrate into the meat without bending, folding or breaking. However, in order to facilitate penetration into the meat, the device may be tapered at its end, e.g. as shown at 40 in FIG. 6. If necessary, however, a small slit may be cut in the meat to facilitate insertion of the device into the meat. The device of the present invention also may be used for monitoring safe cooking of soft foods such as scrambled eggs, baked dishes such as lasagne, casserole dishes or the like, and/or to monitor the temperature of foods held on steam tables or warming trays. The invention also may advantageously be employed for monitoring cooking to temperatures sufficient to kill or de-activate Salmonella, Listeria, Campylobacter or other contaminants. The temperature sensing device made in accordance with the present invention also advantageously may be used, for example, to monitor water temperature in a commercial dishwasher. In such case, the protective tape overlayer should be extended to encapsulate the entire substrate, and if desired, a two-sided adhesive tape is applied to one surface so that the device may be taped, for example, to the bottom of a plate prior to loading the plate into the dishwasher. Alternatively, the device may be made sufficiently heavy so as not to be moved by the water flow in the dishwasher.

Figure 7A:
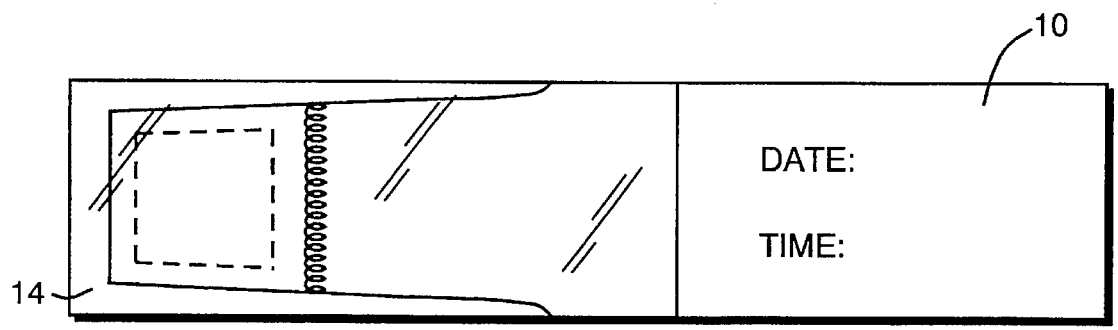
FIGS. 7A and 7B are plan views similar to FIGS. 3A and 3B, and showing the device before use (FIG. 7A) and after use (FIG. 7B).
Figure 7B:
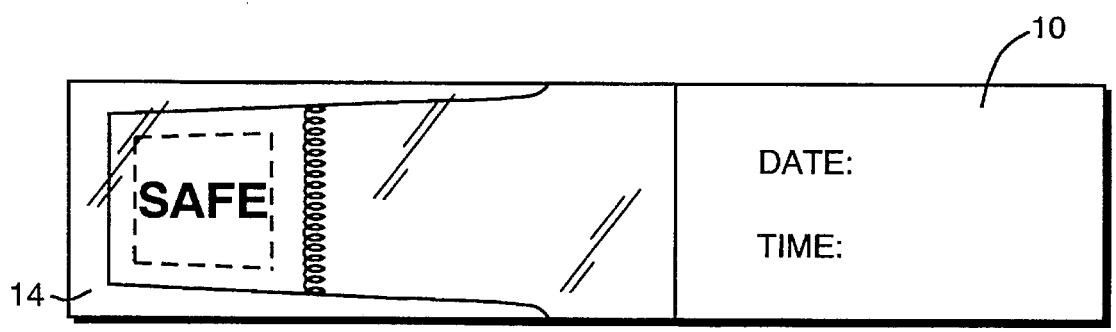

Also, as shown in FIGS. 7A and 7B, the thermochromic material may be printed on the substrate to display a message when a predetermined temperature is reached.

We claim:

1. A temperature sensor device for use in testing cooked foods for recording when a predetermined safe cooking temperature has been reached, comprising, in combination:
    a substantially non-porous elongate substrate having a colored patch formed adjacent at least one end thereof;
    a particulate thermochromic material having a trigger temperature equal to said predetermined safe cooking temperature covering and visually obscuring said patch, and
    a transparent sealable film covering and hermetically sealing said one end of said substrate including said thermochromic material, wherein said thermochromic material: (1) upon exposure to said predetermined safe cooking temperature, becomes sufficiently transparent so as to permit said colored patch to appear visible through the overlying thermochromic material, and (2) upon an abrading motion on the transparent sealable film, may be restored to a visually obscuring state, said device being further characterized by a response time not exceeding about ten seconds.

2. A device according to claim 1, wherein said thermochromic material comprises a material having a trigger point in the range of 140° to 180° F.

3. A device according to claim 2, wherein said thermochromic material has a trigger point of about 160° F.

4. A device according to claim 2, wherein said thermochromic material has a trigger point of about 140° F.

5. A device according to claim 1, wherein said substrate comprises a paperboard material.

6. A device according to claim 5, wherein a portion of said substrate extends beyond said transparent film to provide a writing surface.

7. A device according to claim 6, wherein said writing surface includes indicia for prompting a permanent record.

8. A device according to claim 1, wherein said patch comprises a printed message.

9. A device according to claim 1, wherein the sealable film comprises a pressure sensitive adhesive coated transparent tape.

10. A device according to claim 9, wherein the transparent sealable film comprises a pressure sensitive adhesive coated film.

11. A device according to claim 9, wherein said pressure sensitive adhesive coated transparent tape comprises polyester tape.

12. A device according to claim 1, wherein the thermochromic material comprises dithiuram.

13. A device according to claim 1, and comprising a plurality of ends, each end having a colored patch, each covered by said particulate thermochromic material.

14. A device according to claim 1, wherein the end bearing the colored patch is tapered.

* * * * *